United States Patent [19]

Walton et al.

[11] Patent Number: 5,157,508
[45] Date of Patent: Oct. 20, 1992

[54] TELEVISION SIGNAL EQUIPMENT ASSIGNMENT MATRIX INCLUDING PASSIVE SWITCHING

[75] Inventors: David J. Walton; Robin L. Lince, both of Basingstoke, United Kingdom

[73] Assignee: Sony Corporation, Tokyo, Japan

[21] Appl. No.: 434,452

[22] Filed: Nov. 13, 1989

[30] Foreign Application Priority Data

Nov. 30, 1988 [GB] United Kingdom ............. 8827957

[51] Int. Cl.$^5$ ............................................. H04N 5/76
[52] U.S. Cl. .................................. 358/311; 360/14.1; 360/14.2
[58] Field of Search ............... 358/311, 181, 185, 335; 360/14.1, 14.2, 14.3

[56] References Cited

U.S. PATENT DOCUMENTS

| | | | |
|---|---|---|---|
| 3,900,705 | 8/1975 | Richter | 358/181 |
| 4,037,250 | 7/1977 | McGahan et al. | 358/181 |
| 4,837,638 | 6/1989 | Fullwood | 360/14.2 |
| 4,858,011 | 8/1989 | Jackson et al. | 358/185 |
| 4,979,050 | 12/1990 | Westland et al. | 360/14.1 |

Primary Examiner—Robert L. Richardson
Assistant Examiner—Huy Nguyen
Attorney, Agent, or Firm—Alvin Sinderbrand; William S. Frommer

[57] ABSTRACT

A television signal equipment assignment matrix comprises a plurality of ports respectively connected to video tape recorders and to edit controllers for the video tape recorders, passive switches for effecting connection between a selected two of the ports under control of an externally supplied control signal from an operator's control panel whereby an appropriate such control signal can cause a selected edit controller to be connected to a selected video tape recorder to enable it to be controlled by that edit controller and for commands and status reports to pass therebetween, a further switch for cyclically or randomly tapping the connections between the video tape recorders and the edit controllers to derive the commands and status reports, and a display for displaying indications in dependence on the derived commands and status reports and the physical connections made between the video tape recorders and the edit controllers.

11 Claims, 3 Drawing Sheets

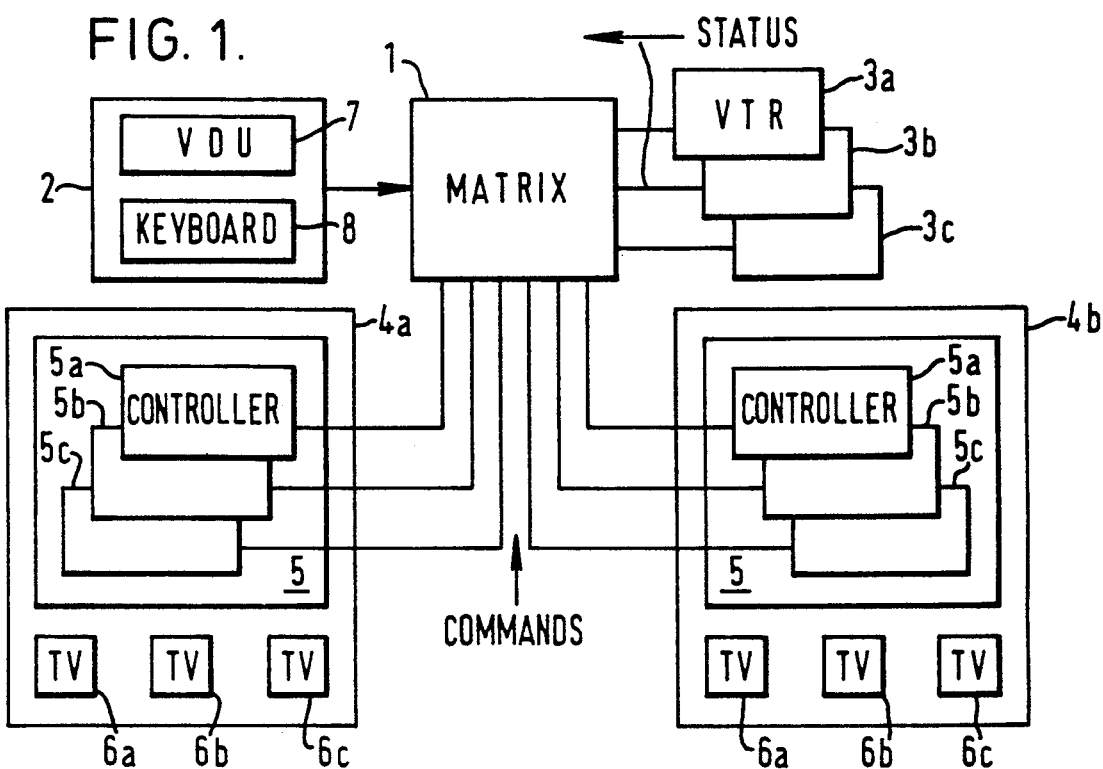
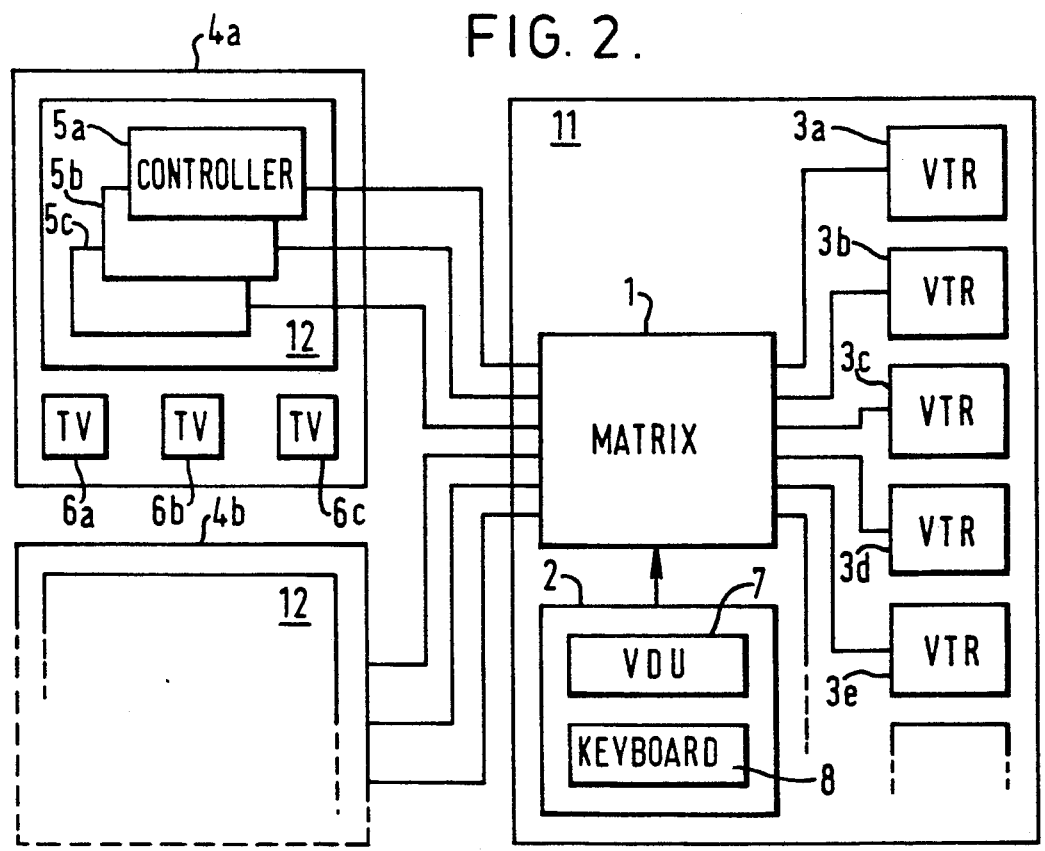

TELEVISION SIGNAL EQUIPMENT ASSIGNMENT MATRIX INCLUDING PASSIVE SWITCHING

BACKGROUND OF THE INVENTION

1. Field of the Invention

This invention relates to television signal editing, and more particularly to a television signal equipment assignment matrix, hereinafter sometimes simply referred to as a matrix, usable in postproduction television signal editing for effecting connection under selective control by a human operator, hereinafter simply referred to as an editor, between devices such as television recording and/or reproducing apparatus and the controllers for these devices.

2. Description of the Prior Art

When editing a recording of a television program, it is quite usual to assemble scenes from one or more sources, the sources generally being video tape recorders (VTRs). A machine which enables this to be done under the control of an editor is called an edit controller. While in a small television signal editing system an edit controller may simply enable the editor to control each of a plurality of play VTRs and a master record VTR, much greater flexibility and economy of equipment can be achieved in a larger editing system if a group of VTRs are usable in common by more than one editor. For a multiple editing system, therefore, a central part of the equipment is a matrix which permits each of a plurality of editors selectively to control play and record VTRs.

The matrix which is used may be passive or active, and FIG. 1 of the accompanying drawings shows in very simplified block form, a known television signal editing system with a passive matrix 1. Connected to the matrix 1 is a matrix operator's control panel 2, VTRs 3 (3a, 3b, 3c, etc) and a plurality of edit suites 4 (4a, 4b, etc) each comprising an edit controller 5 and a plurality of monitor receivers (TV) 6 (6a, 6b, 6c, etc) for displaying television pictures. Each edit controller 5 effectively comprises many controllers 5a, 5b, 5c, etc within a single mechanical casing, and can therefore control a plurality of the VTRs 3. The matrix operator's control panel 2 comprises a video display unit (VDU) 7 and a keyboard 8. As indicated, commands can pass from the edit controllers 5 to the VTRs 3, and status reports can pass from the VTRs 3 to the edit controllers 5.

The matrix 1 is in effect a large switching circuit, and may be considered as orthogonal groups of conductors with the VTRs 3 connected to respective vertical conductors and the edit controllers 5 connected to respective horizontal conductors, while the editor is able selectively to connect the vertical and horizontal conductors at the cross-over points.

As indicated in very simple block form in FIG. 2 of the accompanying drawings, a known large television signal editing system will normally comprise a common group of VTRs 3 (3a, 3b, 3c, etc) which are conveniently housed together in a single machine room 11 having a controlled environment and maintenance facilities, a common matrix 1, and one matrix operator's control panel 2. A plurality of controllers 5 (5a, 5b, 5c, etc) are provided in respective edit suites 4 (4a, 4b, etc) and are housed in respective editing machines 12.

When editing, the editor in a given edit suite 4 will initially request the required number of play VTRs 3 and a master record VTR 3, and these will be allocated from the available VTRs 3. Then, as controlled by the matrix operator's use of the keyboard 8, the matrix 1 makes the physical connections as required between the controllers 5 and the VTRs 3.

The commands issued by the keyboard 8 are carried out by the matrix 1. By selecting the appropriate controller 5a, etc to be connected to a selected VTR 3, a required command, such as 'Play' can be supplied from the selected controller 5a, etc to the selected VTR 3.

Lines (not shown) supply the video, audio and time code signals from the selected VTRs 3 via suitable switches to monitor receivers 6 (6a, 6b, 6c, etc) for review by the editor in the respective edit suite 4.

Commands thus pass from the controllers 5 to the VTRs 3 via the matrix 1, and when a controller 5a say has supplied a command to a VTR 3, the VTR 3 supplies an acknowledgement back via the matrix 1 to the controller 5a. If it is required to know the status of a selected VTR 3, then a status query is sent from a controller 5 via the matrix 1 to the VTR 3, and the response is sent from the VTR 3 via the matrix 1 to the controller 5. Status queries can take various forms, for example 'What is your current time code?' or 'What is your present status?' (which means is the VTR 3 currently in the play mode, the rewind mode, etc).

A passive matrix of the kind described above works well, but is expensive to make. This is because of the very large number of hard wired connections which need to be provided for switching between the number of VTRs 3 and controllers 5 required in a large editing system. To overcome this problem an active matrix can be used, and one example of a known active matrix is the Sony BVR 4000 which is shown in simplified block form in FIG. 3 of the accompanying drawings.

Basically the active television signal equipment assignment matrix 21 of FIG. 3 comprises a high speed bus 22 to which are connected a plurality of microprocessors (μP) 23 (23a, 23b, . . . 23e, etc), one for two VTRs 3a, etc or controllers 5a, etc.

In operation, if, for example, the controller 5a is to command the VTR 3a to play, then the controller 5a sends a low speed coded message to the microprocessor 23a. The microprocessor 23a acknowledges the message and decodes it to ascertain the destination VTR 3a and the nature of the command, and supplies a coded message over the high speed bus 22 designating the destination as the microprocessor 23e. The microprocessor 23e decodes the received message and supplies the appropriate low speed coded message to the VTR 3a, which acknowledges the command. The high speed bus 22 is operated using a token passing serial communication system whereby only one of the microprocessors 23 at a time can pass a message onto the high speed bus 22, the remaining microprocessors 23 then being in the listen mode. The token is passed electronically from one microprocessor 23 to the next in cyclic rotation. Having received a command, a VTR 3 supplies an acknowledgement back to the instructing controller 4 in a similar manner.

In the case of the matrix 21, the matrix operator's control panel 2 (similar to that of FIG. 1) is connected to the high speed bus 22 via a microprocessor 23m which can, by decoding the messages passing over the high speed bus 22, unlike the passive matrix editing system of FIGS. 1 and 2, continuously derive up-dated mnemonics for display on the VDU 7.

For example, the fact that the VTR 3a has been put into the play mode is derived and displayed as a result of the interchange of messages between the microprocessors 23a and 23e, and that mnemonic remains displayed on the VDU 7 until a change in the status of the VTR 3a is ascertained from a further interchange of messages. The matrix operator's control panel 2 uses a software driven menu system to establish which controller 5 communicates with which VTR 3.

Although very much simpler and therefore cheaper than the passive matrix 1 in the television signal editing systems of FIGS. 1 and 2, the active matrix 21 of FIG. 3 is rather slow in operation, due in particular to the waiting time inherent in a token passing communication system. Thus, in the example given above, the total time involved will be the sum of the times taken for the transmission of the low speed messages between the controller 5a and the VTR 3a, the times for two high speed messages to pass over the high speed bus 22, and the two token waiting times when the microprocessors 23a and 23e are waiting for connection to the high speed bus 22. This slowness can be a problem in real-time operation and where time codes are being used.

SUMMARY OF THE INVENTION

One object of the present invention is to provide an improved television signal equipment assignment matrix.

Another object of the present invention is to provide a television signal equipment assignment matrix wherein status reports can be obtained at high speed.

Another object of the present invention is to provide a television signal equipment assignment matrix wherein status reports and commands can be monitored by tapping a connection in a switching means.

According to the present invention there is provided a television signal equipment assignment matrix comprising:

a plurality of ports respectively connectable to devices such as television recording and/or reproducing apparatus and to edit controllers for said devices;

passive switching means for selectively effecting connection between two of said ports under control of an externally supplied control signal, whereby an operator supplying said control signal can cause a selected edit controller to be connected to a selected device to enable said selected device to be controlled by said selected edit controller and for commands and status reports to be passed between said selected device and said selected edit controller;

means for tapping said connections to derive said commands and said status reports; and display means for displaying indications in dependence on said derived commands and status reports.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 shows in very simplified block form a known television signal editing system with a passive matrix;

FIG. 2 shows in very simplified block form a known large television signal editing system with a passive matrix;

Throughout the drawings, like reference numerals refer to like elements.

DESCRIPTION OF THE PREFERRED EMBODIMENTS

Figure 3:
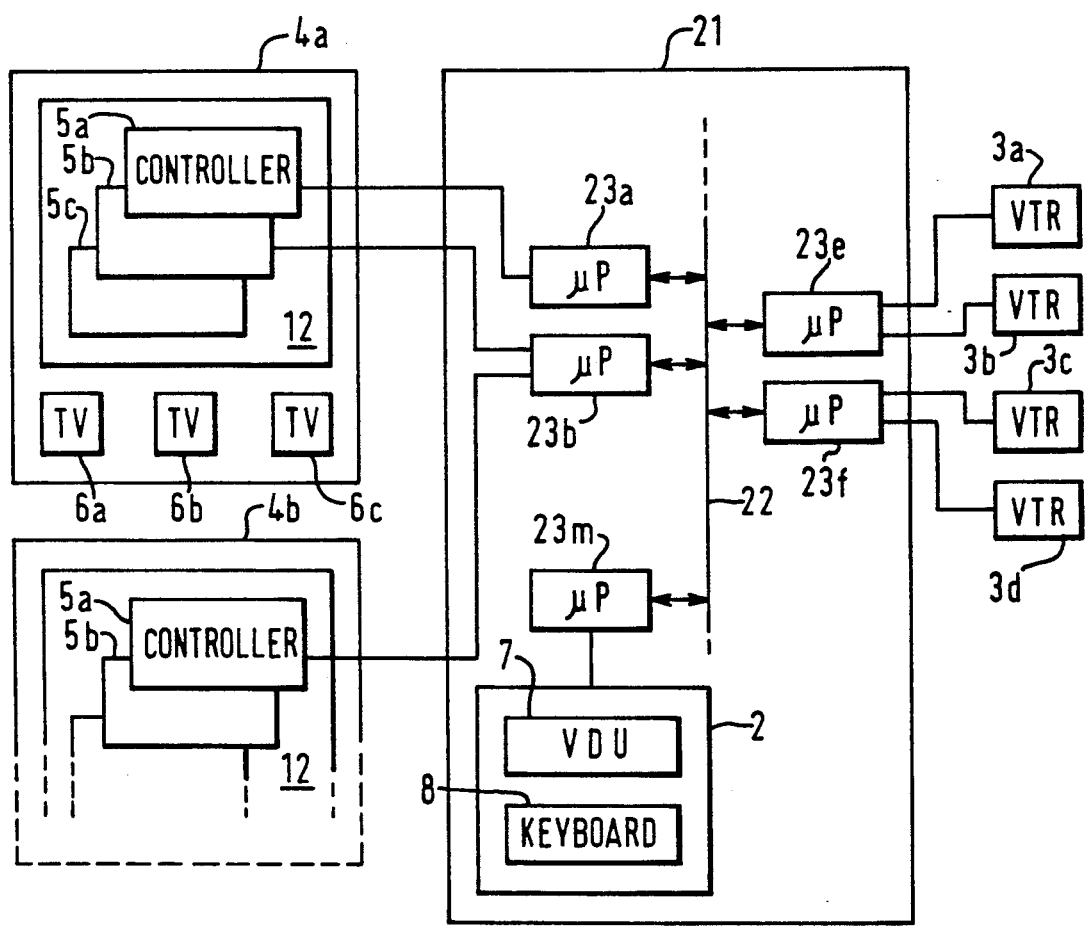
FIG. 3 shows in very simplified block form a known television signal editing system with an active matrix.
Figure 4:
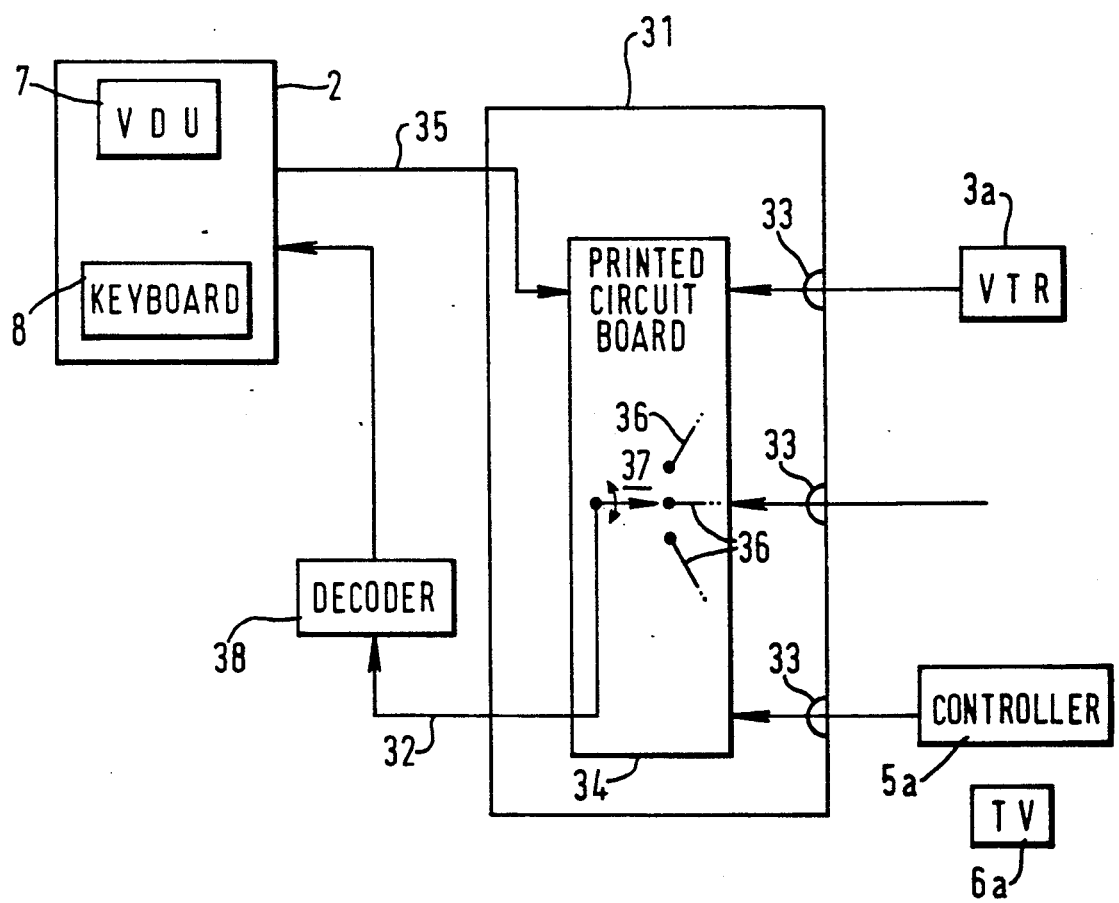
FIG. 4 shows in very simplified block form a television signal editing system including an embodiment of a matrix in accordance with the present invention.

Referring to FIG. 4, the television signal editing system to be described comprises an embodiment of television signal editing assignment matrix 31 which so far as the switching operations are concerned is passive, and in which interrogation necessary to derive the commands and/or status reports to enable required mnemonics to be displayed for the operator, are derived by the provision of a separate switched monitoring line 32.

As in the known editing system described above in connection with FIG. 1, the present editing system also comprises a matrix operator's control panel 2, VTRs 3 (3a, etc), controllers 5 (5a, etc), each able to control a plurality of the VTRs 3, a VDU 7 and a keyboard 8. Likewise, when the present invention is applied to a large television signal editing system of the kind described above in connection with FIG. 2, the arrangement is similar to that described in connection with that figure, with the exception of the form and operation of the matrix 31, which will now be described in more detail.

The matrix 31 comprises a plurality of ports 33 sufficient in number for each of the required number of VTRs 3 and controllers 5 to be connected to a respective port 33. Connected by leads to each port 33 is a printed circuit board 34 which also comprises switches (not shown) to enable a connection selectively to be effected between the lead connected to any port 33, and of the lead connected to any other port 33. The printed circuit board 34 is also connected to a control line 35 which is connected to the matrix operator's control panel 2, and to which the operator's control panel 2 supplies signals to control the switches on the printed circuit board 34.

The matrix 31 comprises a further section on the printed circuit board 34 carrying a plurality of leads 36 respectively connected to the ports 33, and a cyclically operating switch 37 which cycles around these leads to derive therefrom the commands and/or the status reports passing between the VTRs 3 and the controllers 5. Alternatively, the switch 37 on the printed circuit board 34 may be selectively operable. The derived commands and status reports are supplied from the switch 37 to the matrix operator's control panel 2 via a decoder 38, which decodes them to enable the mnemonics displayed on the VDU 8 to be up-dated in dependence on the derived commands and status reports. The switch 37 has a high impedance, so that its periodic connection to the ports 33 does not interfere with any command or status report passing through that port 33 at the time.

To obtain more rapid up-dating, the switch 37 can be arranged only to poll the assigned VTRs 3, or alternatively or in addition the printed circuit board 31 can be duplicated, each of the resulting plurality of printed circuit boards being connected to a respective plurality of the ports 33. In this way groups of the ports 33 can be polled in parallel. As a further refinement, provision may be made for injecting test messages via a monitoring line 32.

It will be seen that the described embodiment of television signal equipment assignment matrix permits the relatively high speed operation which was achieved with the known passive matrix, while at the same time permitting monitoring of the VTRs and the edit controllers, which was not possible with the known passive matrix. At the same time, the manner of making the connections between the ports is simplified, so the matrix is cheaper to produce.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, the printed circuit board construction of the matrix is not an essential feature, and moreover the matrix may additionally have provision for connecting a known serial line communication testing equipment to any selected one of the VTRs 3 and/or the controllers 5 so as to be able to monitor the serial communication between that VTR 3 and a controller 5. In this case the matrix operator's control panel 2 would be used to select the VTR/controller combination to be monitored.

We claim:

1. A television signal equipment assignment matrix comprising: a plurality of ports for connection, respectively, to devices for recording and/or reproducing television signals and sending status reports and to edit controllers for controlling recording and reproducing operations of said devices and sending commands to said devices; passive switching means for selectively effecting connection between two of said ports under control of an externally supplied control signal, whereby said control signal causes a selected edit controller to be connected to a selected device to enable recording and/or reproducing operations of said selected device to be controlled by said selected edit controller and to enable status reports sent by the selected device and commands sent by the selected edit controller to be passed between said selected device and said selected edit controller over a connection therebetween; display means for displaying indications of commands and status reports sent by said edit controllers and said devices connected to said ports; and means for connecting said display means to said ports and for supplying commands and status reports from said ports to said display means.

2. A matrix according to claim 1 wherein said connecting and supplying means comprises a further switching means for cyclically making connections with said ports.

3. A matrix according to claim 1 wherein said connecting and supplying means comprises a further switching means for selectively making connections with said ports.

4. A matrix according to claim 2 wherein said further switching means comprises a printed circuit board carrying leads respectively connected to said ports, and a switch for cyclically making connections with said leads.

5. A matrix according to claim 3 wherein said further switching means comprises a printed circuit board carrying leads respectively connected to said ports, and a switch for selectively making connections with said leads.

6. A matrix according to claim 1 wherein said passive switching means comprises printed circuit board means associated with said ports, and having a respective lead permanently connected to each said port, and a switch for selectively interconnecting said leads under control of said control signal.

7. A matrix according to claim 1 wherein said connecting and supplying means comprises a decoder for receiving and decoding commands and status reports and supplying said decoded commands and status reports to said display means.

8. A matrix according to claim 1 wherein said display means is a video display unit.

9. In combination with a plurality of devices for recording and/or reproducing television signals and sending status reports and a plurality of edit controllers for controlling recording and reproducing operations of said devices and sending commands to said devices, a television signal assignment matrix comprising: a plurality of ports respectively connected to said devices; another plurality of ports respectively connected to said edit controllers; passive switching means for selectively effecting connection between two of said ports under control of an externally supplied control signal, whereby said control signal causes a selected edit controller to be connected to a selected device to enable recording and/or reproducing operations of said selected device to be controlled by said selected edit controller and to enable status reports sent by the selected device and commands sent by the selected edit controller to be passed between said selected device and said selected edit controller over a connection therebetween; display means for displaying indications of commands and status reports sent by said edit controllers and said devices; and means for connecting said display means to said ports and for supplying commands and status reports from said ports to said display means.

10. A matrix according to claim 9 further comprising a matrix operator's control panel connected to said passive switching means.

11. A matrix according to claim 10 further comprising means for connecting serial line communication testing equipment to any selected one of said devices and any selected one of said edit controllers so as to monitor communication between said device and said edit controller.

* * * * *